United States Patent [19]

Hirosawa et al.

[11] Patent Number: 5,766,792
[45] Date of Patent: Jun. 16, 1998

[54] HYDROGEN STORAGE ALLOY ELECTRODE AND MANUFACTURING METHOD OF THE SAME

[75] Inventors: Takamichi Hirosawa; Takaaki Ikemachi, both of Hyogo-ken, Japan

[73] Assignee: Sanyo Electric, Co., Ltd., Moriguchi, Japan

[21] Appl. No.: 717,115

[22] Filed: Sep. 20, 1996

[30] Foreign Application Priority Data

Sep. 20, 1995 [JP] Japan .................................. 7-241642
Oct. 3, 1995 [JP] Japan .................................. 7-256197

[51] Int. Cl.$^6$ .................................................. H01M 10/34
[52] U.S. Cl. ...................... 429/59; 429/101; 429/223; 429/224; 420/900
[58] Field of Search ........................... 420/900; 429/59, 429/101, 223, 224

[56] References Cited

U.S. PATENT DOCUMENTS

| | | | |
|---|---|---|---|
| 4,556,612 | 12/1985 | Thibault et al. | 429/54 |
| 4,696,873 | 9/1987 | Yagasaki et al. | 429/59 |
| 4,820,481 | 4/1989 | Wolff et al. | 419/3 |
| 5,451,474 | 9/1995 | Wu et al. | 429/59 |

FOREIGN PATENT DOCUMENTS

| | | |
|---|---|---|
| 58-46827 | 10/1983 | Japan . |
| 2-12765 | 1/1990 | Japan . |

*Primary Examiner*—Bruce F. Bell
*Attorney, Agent, or Firm*—Nixon & Vanderhye P.C.

[57] ABSTRACT

A hydrogen storage alloy electrode for use in electrochemical hydrogen storage cells, the electrode being in the form of a negative electrode fabricated by sintering a mixture of a hydrogen storage alloy containing manganese and an alloy containing a measured amount of manganese.

11 Claims, 1 Drawing Sheet

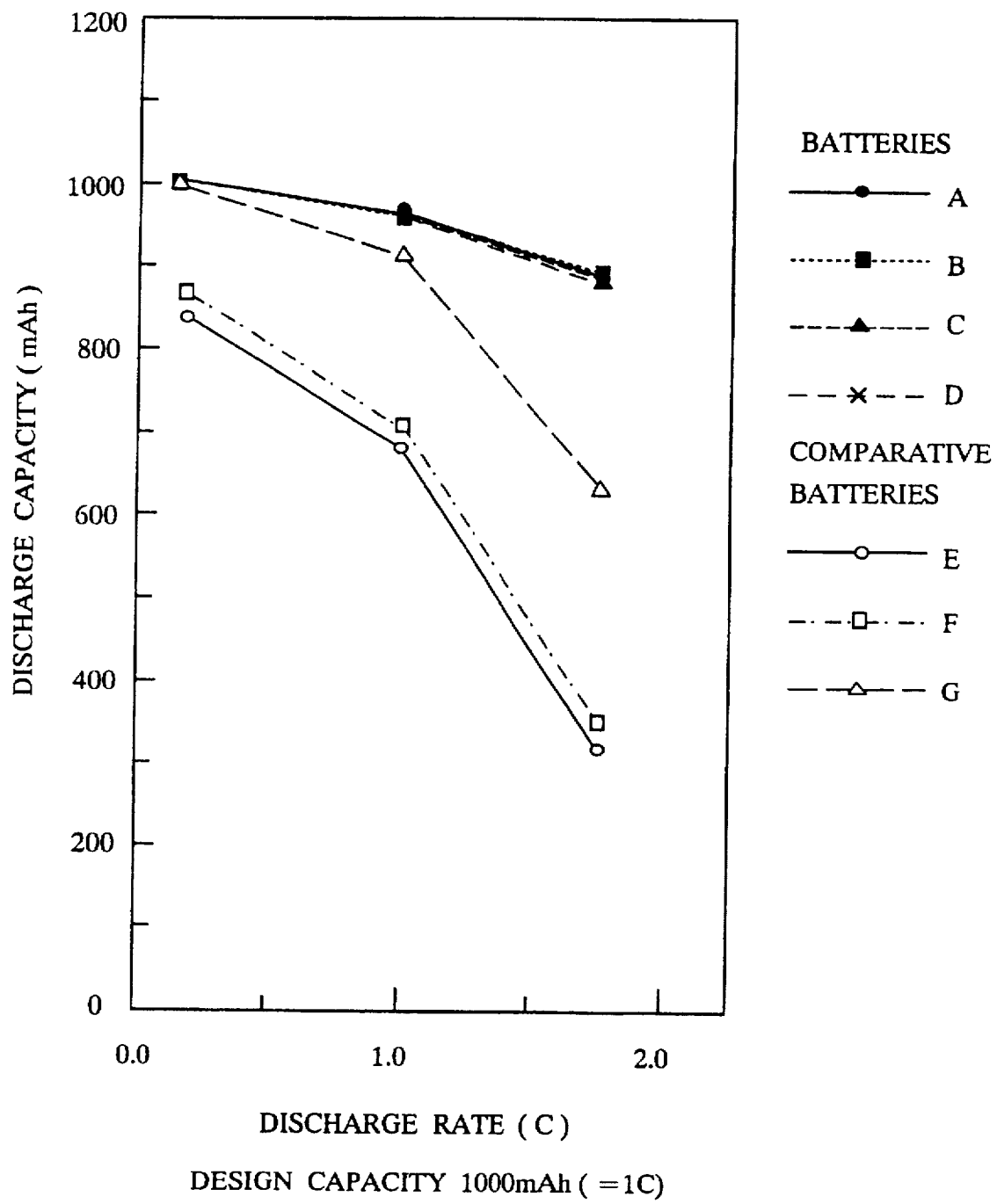

HYDROGEN STORAGE ALLOY ELECTRODE AND MANUFACTURING METHOD OF THE SAME

BACKGROUND OF THE INVENTION

1. Field of the Invention

The present invention relates to a hydrogen storage alloy electrode capable of reversibly electrochemically storing and discharging hydrogen. More particularly, the present invention relates to a hydrogen storage alloy negative electrode of the sintering type and a manufacturing method of the same.

2. Description of the Prior Art

In recent advances of electronic technology, development of compact and lightweight high performance secondary batteries of higher energy density is strongly required as a power source for portable cordless electronic equipments. In such requirement, metal hydride batteries using a hydrogen storage alloy negative electrode is particularly noticed as a clean energy rather than lead-acid, nickel-cadmium or other batteries.

A conventional hydrogen storage alloy negative electrode of the non-sintering type for alkaline cells is manufactured by the steps of mixing powdered hydrogen storage alloy materials with binder agents such as polyethylene oxide, polyvinyl alcohol or the like and coating a slurry of the mixture on conductive core plate such as a perforated (punching) metal plate. In the hydrogen storage alloy negative electrode, the binder agents must be interposed between particles of the hydrogen storage alloy materials and between the hydrogen storage alloy and the conductive core plate to retain the hydrogen storage alloy on the conductive core plate. The discharge characteristics and capacity of the hydrogen storage alloy negative electrode are deteriorated due to insulation resistance of the binder agents.

To solve the problem, there has been proposed a manufacturing method of a hydrogen storage alloy negative electrode of the sintering type, for example, in Japanese Patent Publication No. 58(1983)-46827, Japanese Patent Laid-open Publication No. 2(1990)-12765, etc. The manufacturing method disclosed therein comprises the steps of mixing powdered hydrogen storage alloy materials with powders of precursor materials, such as Co, Ni, $TiNi_x$ and the like, subjecting the mixture of the powder materials placed on a perforated metal plate to a compaction process and sintering the mixture on the metal plate in a vacuum or an inert environment to provide a sintered hydrogen storage alloy negative electrode of higher strength.

In the manufacturing process of the negative electrode, however, when the hydrogen storage alloy materials containing a measured amount of manganese are sintered after mixed with the powders of Co, Ni, $TiNi_x$, the manganese melts out of the hydrogen storage alloy, resulting in degradation of the composition of the hydrogen storage alloy. This decreases the discharge capacity of the negative electrode.

SUMMARY OF THE INVENTION

It is, therefore, a primary object of the present invention to provide an electrochemical hydrogen storage alloy negative electrode and a manufacturing method of the same capable of restraining degradation of the composition of the hydrogen storage alloy.

According to the present invention, the object is accomplished by providing a hydrogen storage alloy electrode for use in electrochemical hydrogen storage cells, the electrode being in the form of a negative electrode fabricated by sintering a mixture of a hydrogen storage alloy containing manganese and an alloy containing a measured amount of manganese.

According to an aspect of the present invention, there is provided a method of manufacturing a hydrogen storage alloy electrode for use as a negative electrode in electrochemical hydrogen storage cells, the method comprising the steps of increasing an amount of manganese contained in powdered hydrogen storage alloy materials having a desired composition, mixing nickel-metal or a compound of nickel with the powdered hydrogen storage alloy materials, and sintering a mixture of the powdered hydrogen storage alloy materials and the nickel-metal or the compound of nickel in an inert atmosphere or a reduced atmosphere.

According to another aspect of the present invention, there is provided a method of manufacturing a hydrogen storage alloy electrode for use as a negative electrode in electrochemical hydrogen storage cells, the method comprising the steps of preparing a measured amount of powdered hydrogen storage alloy materials having a desired composition including a measured amount of manganese, mixing powder of a Mn-Ni or Mn-Fe alloy with the powdered hydrogen storage alloy materials, preparing a slurry of a mixture of the powder of the Mn-Ni or Mn-Fe alloy and the powdered hydrogen storage alloy materials and coating the slurry on a core plate, compacting the mixture on the core plate after drying, and sintering the mixture on the core plate in an environment of mixed gases of hydrogen and argon.

BRIEF DESCRIPTION OF THE DRAWING

Other objects, features and advantages of the present invention will be more readily appreciated from the following detailed description of preferred embodiments thereof when taken together with the accompanying drawing, which illustrates discharge capacities in relation to a discharge rate (a design rate 1000 mAh).

DESCRIPTION OF THE PREFERRED EMBODIMENTS

Preferred embodiments and their comparative embodiments of hydrogen storage alloys having a desired composition represented by the formula "$MmNi_{3.70}Co_{0.60}Mn_{0.60}Al_{0.20}$ will be described hereinafter.

EXAMPLE 1

An amount of a compound of nickel, cobalt, manganese and aluminum measured at a ratio of 1 : 3.7 : 0.6 : 0.6 : 0.2 in their element forms was mixed and subjected to an argon atomizing process to fabricate a solid ingot of hydrogen storage alloy having the composition represented by the formula "$MmNi_{3.70}Co_{0.60}Mn_{0.60}Al_{0.20}$. The ingot of hydrogen storage alloy was mechanically comminuted, and the resulting powders of more than 150 μm and less than 25 μm in particle diameter were removed by mesh pass to yield powdered hydrogen storage alloy materials of about 80 μm in mean particle diameter.

To fabricate a sintered hydrogen storage alloy negative electrode, an amount of methanol solution of manganese acetylacetone containing nickel powder was heated at a temperature of approximately 260° centigrade to adhere the manganese to the nickel powder at a ratio of about 2 : 1 thereby to yield mixed powders of a Mn-Ni alloy. The mixed powders of the Mn-Ni alloy were mixed with the powdered
} hydrogen storage alloy materials at a weight ratio of 1 : 9, and an amount of aqueous solution of 2 wt % polyethylene oxide was added as a paste agent to the mixture of the Mn-Ni alloy powders and hydrogen storage alloy materials at a ratio of 0.5:1 to prepare a slurry. The slurry of the mixture was coated on a nickel plated metallic perforated core plate and dried. Thereafter, the mixture of the two powders was compacted at a pressure rate of 10% to enhance the packing density and subjected to a reducing heat treatment for one hour at approximately 900° centigrade in an environment of mixed gases of hydrogen and argon (4 vol % hydrogen). The hydrogen storage alloy electrode of the sintering type manufactured by the foregoing process is called a sample "a" hereinafter. After the heat treatment, the composition of the sample "a" was inspected by electron probe microanalysis (EPMA). As a result of the inspection, it was found that the composition of the sample "a" was represented by the formula: $MmNi_{3.71}Co_{0.60}Mn_{0.59}Al_{0.20}$. The segregation in the sample "a" was substantially the same before the heat treatment of the mixture of the two powders.

EXAMPLE 2

An amount of powders of 10 wt % $MnNi_2$ was mixed with the powdered hydrogen storage alloy materials fabricated in the same manner as in Example 1, and an aqueous solution of polyethylene oxide was added to the mixture of the powders of $MnNi_2$ and hydrogen storage alloy materials to prepare a slurry. The slurry of the mixture was coated on a nickel plated metallic perforated core plate and dried. Thereafter, the mixture of the two powders was compacted at a pressure rate of 10% to enhance the packing density and subjected to a reducing heat treatment for one hour at approximately 900° centigrade in an environment of mixed gases of hydrogen and argon (4 vol % hydrogen). The hydrogen storage alloy electrode of the sintering type manufactured by the foregoing process is called a sample "b" hereinafter. After the heat treatment, the composition of the sample "b" was inspected by electron probe microanalysis (EPMA). As a result of the inspection, it was found that the composition of the hydrogen storage alloy electrode "b" was represented by the formula: $MmNi_{3.70}Co_{0.60}Mn_{0.60}Al_{0.20}$. The segregation in the hydrogen storage alloy electrode "b" was substantially the same before the heat treatment of the mixture of the powders of Mn $Ni_2$ and hydrogen storage alloy material.

EXAMPLE 3

An amount of powders of $MnCl_2$, $Fe_2O_3$ and carbon was mixed with the powdered hydrogen storage alloy materials prepared by the same manner as in Example 1 at a weight ratio of 0.5: 0.5: 0.5: 9, and an aqueous solution of polyethylene oxide was added to the mixture of the two powders to prepare a slurry. The slurry of the mixture was coated on a nickel plated metallic perforated core plate and dried. Thereafter, the mixture of the two powders was compacted at a pressure rate of 10% to enhance the packing density and subjected to a reducing heat treatment for one hour at approximately 900° centigrade in an environment of mixed gases of hydrogen and argon (4 vol % hydrogen). The hydrogen storage alloy electrode of the sintering type manufactured by the foregoing process is called a sample "c" hereinafter. After the heat treatment, the composition of the hydrogen storage alloy electrode "c" was inspected by electron probe microanalysis (EPMA). As a result of the inspection, it was found that the composition of the hydrogen storage alloy electrode "c" was represented by the formula: $MmNi_{3.71}Co_{0.60}Mn_{0.59}Al_{0.20}$. The segregation in the hydrogen storage alloy electrode "c" was substantially the same before the heat treatment of the mixture of the powders of $MnCl_2$, $Fe_2O_3$ and carbon and powdered hydrogen storage alloy material.

EXAMPLE 4

An amount of powders of 10 wt % $MnFe_2$ was mixed with the powdered hydrogen storage alloy materials prepared in the same manner as in Example 1, and an aqueous solution of polyethylene oxide was added to the mixture of the two powders to prepare a slurry. The slurry of the mixture was coated on a nickel plated metallic perforated core plate and dried. Thereafter, the mixture of the two powders was compacted at a pressure rate of 10% to enhance the packing density and subjected to a reducing heat treatment for one hour at approximately 900° centigrade in an environment of mixed gases of hydrogen and argon (4 vol % hydrogen). The hydrogen storage alloy electrode of the sintering type manufactured by the foregoing process is called a sample "d" hereinafter. After the heat treatment, the composition of the hydrogen storage alloy electrode "d" was inspected by electron probe microanalysis. As a result of the inspection, it was found that the composition of the sample "d" was represented by the formula: $MmNi_{3.70}Co_{0.60}Mn_{0.60}Al_{0.20}$. The segregation in the sample "d" was substantially the same before the heat treatment of the mixture of the powders of $MnFe_2$ and hydrogen storage alloy material.

COMPARATIVE EXAMPLE 1

Powdered hydrogen storage alloy materials having the composition: $MmNi_{3.70}Co_{0.60}Mn_{0.60}Al_{0.20}$ were prepared in the same manner as in Example 1. An amount of powder of 10 wt % metal-nickel was mixed with the powdered hydrogen storage alloy materials, and an aqueous solution of polyethylene oxide was added to the mixture of the two powders to prepare a slurry. The slurry of the mixture was coated on a nickel plated metallic perforated core plate and dried. Thereafter, the mixture of the two powders was compacted at a pressure rate of 10% to enhance the packing density and subjected to a reducing heat treatment for one hour at approximately 900° centigrade in an environment of mixed gases of hydrogen and argon (4 vol % hydrogen). The hydrogen storage alloy electrode of the sintering type manufactured by the foregoing process is called a comparative sample "e" hereinafter. After the heat treatment, the composition of the comparative sample "e" was inspected by electron probe microanalysis. As a result of the inspection, it was found that the composition of the sample "e" was represented by the formula: $MmNi_{3.77}Co_{0.60}Mn_{0.28}Al_{0.20}$. In the composition of the sample "e", the amounts of cobalt and aluminum were substantially the same as in the hydrogen storage alloy before the heat treatment, and the amount of nickel slightly increased from 3.70 to 3.77. However, the amount of manganese noticeably decreased from 0.60 to 0.28. This causes internal segregation of the manganese, resulting in non-uniformities in the composition of the hydrogen storage alloy. In this respect, it is assumed that the internal segregation in the hydrogen storage alloy was caused by the transfer of the manganese into the nickel powder adjacent the particle surfaces of the hydrogen storage alloy materials during the sintering process.

COMPARATIVE EXAMPLE 2

Powdered hydrogen storage alloy materials having the composition: $MmNi_{3.70}Co_{0.60}Mn_{0.60}Al_{0.20}$ were prepared in the same manner as in Example 1. An amount of powder of 10 wt % TiNi was mixed with the powdered hydrogen storage alloy materials, and an aqueous solution of polyethylene oxide was added to the mixture of the two powders to prepare a slurry. The slurry of the mixture was coated on a nickel plated metallic perforated core plate and dried. Thereafter, the mixture of the two powders was compacted at a pressure rate of 10% to enhance the packing density thereof and subjected to a reducing heat treatment for one hour at approximately 900° centigrade in an environment of mixed gases of hydrogen and argon (4 vol % hydrogen). The hydrogen storage alloy electrode of the sintering type manufactured by the foregoing process is called a comparative sample "f" hereinafter.

After the heat treatment, the composition of the comparative sample "f" was inspected by electron probe microanalysis (EPMA). As a result of the inspection, it was found that the composition of the sample "f" was represented by the formula: $MmNi_{3.81}Co_{0.61}Mn_{0.32}Al_{0.21}$. In the composition of the sample "f", the amounts of cobalt and aluminum were substantially the same as in the hydrogen storage alloy before the heat treatment, and the amount of nickel slightly increased from 3.70 to 3.81. However, the amount of manganese noticeably decreased from 0.60 to 0.32. This causes internal segregation of the manganese, resulting in non-uniformities in the composition of the hydrogen storage alloy. In this respect, it is assumed that during the sintering process, the internal segregation in the hydrogen storage alloy was caused by transfer of the manganese into the powders of TiNi alloy adjacent the particle surfaces of the hydrogen storage alloy materials.

COMPARATIVE EXAMPLE 3

Powdered hydrogen storage alloy materials having the composition: $MmNi_{3.70}Co_{0.60}Mn_{0.60}Al_{0.20}$ were prepared in the same manner as in Example 1. An amount of aqueous solution of 2 wt % polyethylene oxide was added to the powdered hydrogen storage alloy materials at a weight ratio of 0.5 : 1 to prepare a slurry thereof. The slurry of the powdered hydrogen storage alloy material was coated on a nickel plated metallic perforated core plate and dried. Thereafter, the hydrogen storage alloy material was compacted at a pressure rate of 10% to enhance the packing density thereof and subjected to a reducing heat treatment for one hour at approximately 900° centigrade in an environment of mixed gases of hydrogen and argon (4 vol % hydrogen). The hydrogen storage alloy electrode of the sintering type manufactured by the foregoing process is called a comparative sample "g" hereinafter.

CHARACTERISTIC TEST (Test 1)

Hydrogen rechargeable secondary cells using the samples "a"–"g" as a negative electrode and a conventional nickel hydroxide electrode of the sintering type as a positive electrode were tested. In the manufacture of the secondary cells, the negative and position electrodes were disposed in a housing and opposed to one another through a separator therebetween. Thereafter, the housing was filled with a sufficient amount of 30 wt % KOH solution and sealed to provide a hydrogen storage rechargeable secondary cell of nominal capacity 300 mAh. In the tests, the secondary cells each were charged at 30 mA for sixteen hours. After rested for one hour, the secondary cells each were discharged at 60 mA until the voltage becomes 1.0V to measure the discharge capacity. The results are illustrated in the following table.

Provided that, the discharge capacity of the comparative sample "g" is represented by "100 In the table.

| Electrode | Composition of hydrogen storage alloy (After sintering) | Discharge capacity |
| --- | --- | --- |
| a | $MmNi_{3.71}Co_{0.60}Mn_{0.59}Al_{0.20}$ | 102 |
| b | $MmNi_{3.70}Co_{0.60}Mn_{0.60}Al_{0.20}$ | 102 |
| c | $MmNi_{3.71}Co_{0.60}Mn_{0.59}Al_{0.20}$ | 101 |
| d | $MmNi_{3.70}Co_{0.60}Mn_{0.60}Al_{0.20}$ | 102 |
| e | $MmNi_{3.77}Co_{0.60}Mn_{0.28}Al_{0.20}$ | 52 |
| f | $MmNi_{3.81}Co_{0.61}Mn_{0.32}Al_{0.21}$ | 60 |

From the table, it is apparent that the discharge capacity of each of the samples "a", "b", "c" and "d" becomes higher than that of the comparative samples "e" and "f". Since in the samples "a"–"d", an alloy containing a measured amount of manganese or a compound of manganese was mixed with the powdered hydrogen storage alloy materials and sintered, the composition of the hydrogen storage alloy is maintained as in the desired composition without causing any degradation thereof even if the manganese melts out of the hydrogen storage alloy during the sintering process. In addition, the melted manganese is integrated with nickel-metal to form a MnNi-metal superior in conductivity. On the other hand, the hydrogen storage alloys in the comparative samples "e" and "f" were mixed with nickel-metal, TiNi without containing any manganese. As a result, the manganese melts out of the hydrogen storage alloy during the sintering process, resulting in degradation of the composition of the hydrogen storage alloy.

(Test 2)

Nickel hydrogen batteries using the samples "a"–"g" as a negative electrode and a conventional nickel hydroxide electrode of the sintering type as a positive electrode were tested. In the manufacture of the batteries, the negative and positive electrodes were wound spirally through a separator fabricated of non-woven polypropylene and disposed within a housing. Thereafter, the housing was filled with a sufficient amount of electrolyte of 30 wt % KOH and sealed to provide a nickel hydrogen battery of nominal capacity 1000 mAh In a single size. Hereinafter, the nickel hydrogen batteries using the samples "a"–"d" are called batteries A, B, C and D of the present invention, while the nickel hydrogen batteries using the samples "e", "f" and "g" are called comparative batteries E, F and G.

In this test, the discharge rate dependency of each of the batteries A–G was measured. For measurement of the discharge rate dependency, the batteries A–G were charged at 100 mA for sixteen hours. After rested for one hour, the batteries A–G were discharged respectively at 200 mA, 1000 mA and 2000 mA until the voltage becomes 1.0V to measure the discharge capacity. The results are illustrated in the single figure. From the characteristic lines illustrated in the figure, it is apparent that each discharge capacity of the comparative batteries E and F respectively mixed with Ni or TiNi in the sintering process becomes small in comparison with the discharge capacity of the comparative battery G while each discharge capacity of the batteries A–D using the alloy containing a measured amount of manganese or the compound of manganese becomes larger than the discharge capacity of the comparative battery G. Particularly, it is noted that the discharge capacity of each of the batteries A–D at 2C (2000 mA) is considerably superior than that of the comparative batteries E–G.

Although in the embodiments described above, Ni or Fe was used as a metal other than the manganese to be mixed with the hydrogen storage alloy. Co, Al or Cu may be used or at least one metal chosen from the group consisting of Ni, Fe, Co, Al and Cu may be used.

What is claimed is:

1. A hydrogen storage alloy electrode for use in electrochemical hydrogen storage cells, said electrode comprising:
   a negative electrode fabricated by sintering a mixture of a hydrogen storage alloy having a composition represented by the formulas $MmNi_{3.70}Co_{0.60}Mn_{0.60}Al_{0.20}$ or $MmNi_{3.71}Co_{0.60}Mn_{0.59}Al_{0.20}$ and an alloy containing a measured amount of manganese.

2. A hydrogen storage alloy electrode as claimed in claim 1, wherein the alloy containing a measured amount of manganese is a Mn-Ni alloy.

3. A hydrogen storage alloy electrode as claimed in claim 1, wherein the alloy containing a measured amount of manganese is a Mn-Fe alloy.

4. The hydrogen storage alloy electrode of claim 1, wherein the alloy containing a measured amount of manganese includes at least one of the group consisting of: Ni, Fe, Co, Al and Cu.

5. The hydrogen storage alloy electrode of claim 1, wherein the alloy containing a measured amount of manganese includes at least one of the group consisting of: Ni, Fe, Co, Al and Cu.

6. The hydrogen storage alloy electrode of claim 1, wherein a portion of Ni in the storage alloy is substituted for the manganese.

7. A method of manufacturing a hydrogen storage alloy electrode for use as a negative electrode in electrochemical hydrogen storage cells, said method comprising the steps of:
   increasing an amount of manganese contained in powdered hydrogen storage alloy materials having a composition represented by the formulas $MmNi_{3.70}Co_{0.60}Mn_{0.60}Al_{0.20}$ or $MmNi_{3.71}Co_{0.60}Mn_{0.59}Al_{0.20}$.
   mixing nickel-metal or a compound of nickel with the powdered hydrogen storage alloy materials; and
   sintering a mixture of the powdered hydrogen storage alloy materials and the nickel-metal or the compound of nickel in an inert atmosphere or a reduced atmosphere.

8. A method of manufacturing a hydrogen storage alloy electrode for use as a negative electrode in electrochemical hydrogen storage cells, said method comprising the steps of:
   preparing a measured amount of powdered hydrogen storage alloy materials having a composition represented by the formulas $MmNi_{3.70}Co_{0.60}Mn_{0.60}Al_{0.20}$ or $MmNi_{3.71}Co_{0.60}Mn_{0.59}Al_{0.20}$;
   mixing powder of a Mn-Ni alloy with the powdered hydrogen storage alloy materials;
   preparing a slurry of a mixture of the powder of the Mn-Ni alloy and the powdered hydrogen storage alloy materials and coating the slurry on a core plate;
   compacting the mixture on the core plate after drying; and
   sintering the mixture on the core plate in an environment of mixed gases of hydrogen and argon.

9. A method of manufacturing a hydrogen storage alloy electrode for use as a negative electrode in electrochemical hydrogen storage cells, said method comprising the steps of:
   preparing a measured amount of powdered hydrogen storage alloy materials having a composition represented by the formulas $MmNi_{3.70}Co_{0.60}Mn_{0.60}Al_{0.20}$ or $MmNi_{3.71}Co_{0.60}Mn_{0.59}Al_{0.20}$;
   mixing powder of a Mn-Fe alloy with the powdered hydrogen storage alloy materials;
   preparing a slurry of a mixture of the powder of Mn-Fe alloy and the powdered hydrogen storage alloy materials and coating the slurry on a core plate;
   compacting the mixture on the core plate after drying; and
   sintering the mixture on the core plate in an environment of mixed gases of hydrogen and argon.

10. A method of manufacturing a negative electrode for an electrochemical hydrogen storage cell, the method comprising the steps of:
    preparing a powdered hydrogen storage alloy compound of Mm, Ni, Co, Mn and Al having a ratio of 1:3.7:0.6:0.6:0.2 in their respective element forms;
    mixing a powder of Mn-X alloy with the powdered hydrogen storage alloy, wherein X is at least one of the group consisting of: Ni, Fe, Co, Al and Cu;
    preparing a slurry of a mixture of the powder of said Mn-X alloy and said powdered hydrogen storage alloy;
    coating the slurry on a core plate;
    compacting the mixture on the core plate after drying; and
    sintering the mixture on the core plate in an environment of mixed gases of hydrogen and argon.

11. A method of manufacturing a negative electrode for an electrochemical hydrogen storage cell, the method comprising the steps of:
    preparing a powdered hydrogen storage alloy compound of Mm, Ni, Co, Mn and Al having a ratio of 1:3.7:0.6:0.6:0.2 in their respective element forms;
    mixing a powder of nickel-metal or a compound of nickel with the powdered hydrogen storage alloy; and
    sintering the mixture of powdered hydrogen storage alloy and nickel-metal or compound of nickel in an inert atmosphere or a reduced atmosphere.

* * * * *